United States Patent Office 3,424,472
Patented Jan. 28, 1969

3,424,472
WHEEL POSITIONING ARRANGEMENT FOR PALLET VEHICLE
David James Townsend, Birmingham, England, assignor to C.D.T. Design Consultants Limited, Edgbaston, Birmingham, England, a British company
Filed Sept. 21, 1966, Ser. No. 581,062
U.S. Cl. 280—47.11                2 Claims
Int. Cl. B62b 3/00

ABSTRACT OF THE DISCLOSURE

A load-carrying pallet comprises a frame upon which are individually pivotally mounted at least three rolling friction reducing units, the frame carrying operating bars connected to one another around the frame, the junction of each adjacent pair of operating bars being also connected to one of the rolling friction reducing units and the frame carrying a plurality of actuating means connected to the operating bars respectively, actuation of any one of said actuating means controlling all of the operating bars to move all of the rolling friction reducing units between first and second angularly spaced positions.

---

This invention relates to wheeled vehicles, particularly load-carrying pallets, platforms and the like.

I have previously proposed to provide a wheeled load carrying vehicle capable of travel in either of two directions, which most usefully will be at right angles to one another, although other angles are possible. Such an arrangement is particularly advantageous in the mechanical handling of goods and enables for example square pallets to be stacked to a predetermined pattern to enable maximum utilisation of a given storage space, utilising essentially simple and economical vehicles.

An object of the present invention is to provide an improved vehicle construction.

According to the present invention a load-carrying pallet is provided with at least three rolling friction reducing units disposed for simultaneous engagement with a surface, at least two of said rolling friction reducing-units being directional so as to determine the direction of movement of the pallet with respect to said surface, the directional rolling friction-reducing units being adjustable between at least two predetermined positions which determine different directions of movement of the pallet, the pallet including means for simultaneously operating said directional rolling friction-reducing units into one of said predetermined positions.

Preferably, and in the simplest form, the vehicle has four directional rolling friction-reducing units which may be located at or near the corners of a square pallet.

Advantageously the directional rolling friction-reducing units are wheels mounted on swivellable supports and in which the operating means includes an operating bar connecting each swivellable support to each next adjacent support.

A preferred embodiment of the invention is hereinafter particularly described with reference to the accompanying drawings in which.

Figure 1:
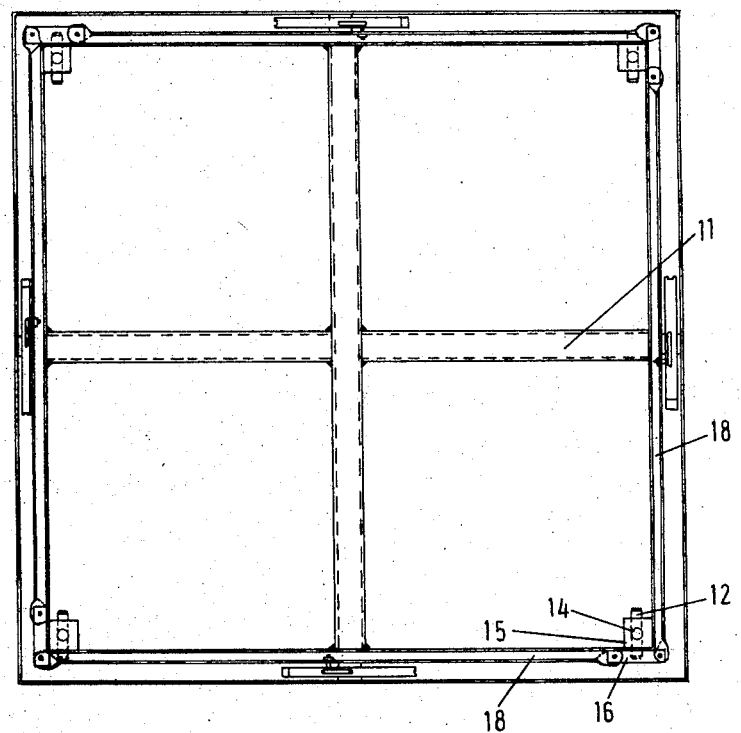
FIGURE 1 is a plan view of a pallet according to the invention with the top parts of the peripheral channel section removed to show the operating mechanism.

Referring to the drawings the pallet comprises a square frame 10 of inverted U channel-section with two cross-beams 11 symmetrically arranged within the square. The channel-sections are secured together by welding.

A wheel 12 is provided at each corner of the frame 10, the wheel being mounted for rotation in a fork 13 of a wheel carrier having a spindle 14 which is journalled in a wheel support bracket 15 attached to the frame.

Each wheel carrier is provided with a link 16 welded transversely thereof at a position such that it lies below the lower extremity of the frame. Each link 16 is connected at each end by pivots 17 to operating bars 18 which extend with in the channel section of the frame. The ends 19 of the bars 18 are turned to lie perpendicular to the frame sides and parallel with the links 16. It will be apparent that a complete linkage exists around the frame so that movement of any one operating bar will cause movement of all the other operating bars and links.

Figure 2:
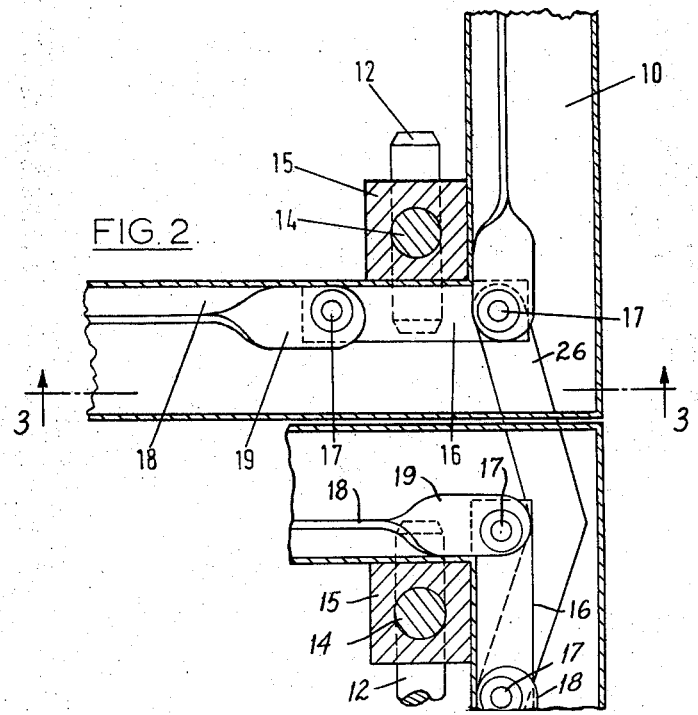
FIGURE 2 is a detail horizontal sectional view of one of the wheels and its supporting mechanism, taken on the line 2—2 of FIGURE 3.
Figure 3:
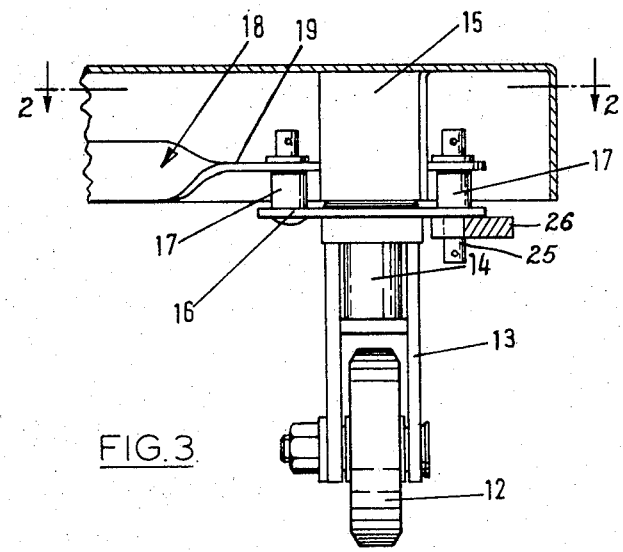
FIGURE 3 is a vertical sectional view on the line 3—3 of FIGURE 2 of one of the wheels and supporting mechanism shown in the same position as in FIGURE 2.
Figure 4:
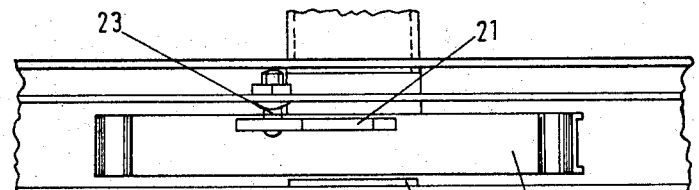
FIGURE 4 is a detail plan view of one of the actuating means.
Figure 5:
FIGURE 5 is a side view of the actuating means.

It will be seen from FIGURE 2 that longitudinal movement of the bar 18 which lies parallel to the wheel 12 will cause the link 16 to move until it is aligned therewith, at which position the wheel 12 will lie at right angles to its original direction.

In the embodiment shown in the drawings the alignment of the wheels is determined by the abutment of the ends 19 of the operating bars with the inner surface of the channel members of the frame 10. Co-operating abutment means may, if desired, be provided on any suitable part to ensure correct alignment or an ancillary location device may be used. Such a device may, for example, comprise a spring loaded ball which moves with the link 16 and engages with recesses appropriately positioned on the frame.

Each actuating means comprises a T-shaped member consisting of a U-section pedal arm 20 rigid with a perpendicular arm 21. The junction of the perpendicular arms 20 and 21 is pivoted at 24 to a U-shaped bracket 22 which extends downwardly from the frame. The other end of arm 21 is pivoted at 23 to the operating bar 18. The arms act as a bell-crank lever having two pedal arms, so that in order to move wheels to a second position it is merely necessary to depress the uppermost pedal arm 20. The provision of four actuating means, one on each side of the pallet, enables the wheel turning operating to be effected from any side of the pallet.

The pallet also comprises, of course, a load bearing surface which may, for example, be a square sheet (not shown) which rests on top of the frame.

The pallet described above is particularly convenient in use since it may be operated from one direction to another merely by foot-pressure. In addition, the device uses only four wheels which represents a considerable reduction in cost over a pallet having two sets of wheels, one set for movement in each direction. Furthermore, the change in direction does not involve lifting the pallet and its load so that the operation requires a comparatively small applied force. The centrally located actuating means and the location of the operating bars enables a fork lift truck to be used to lift the pallet from any side.

Ancillary locking devices may be used if desired but they are generally unnecessary as it is possible to lock the pallet in its tracks by applying pedal pressure which tends to turn the wheels so that they bind on the side flanges of the track.

In addition to the convenience in operation the pallets are easily shipped and stored prior to assembly. The frame may be welded together and a load bearing platform provided on one side thereof. The wheels and actuating means can then be disposed within the frame to give a neat package. A smaller package is achieved by arranging the unwelded frame channel members opposite to one another and disposing the wheels and actuating means within the space defined thereby. The load bearing platform is then preferably comprised of a number of parallel strips which can be packed around the outside of the assembly of channel members.

In certain circumstances it may be desirable to couple one or more pallets together and it is then desirable that provision be made for coupling the operating means. This may be achieved as shown in FIGURE 2 by providing a lug 25 on the link 16 of the wheel support and coupling the lugs 25 of adjacent pallets by means of an extra link 26. This link 26 is conveniently cranked as shown in FIGURE 2 to accommodate the turning wheel support. It is then possible to change the wheel direction by means of any of the actuating means on the coupled pallets.

I claim:

1. A load carrying pallet having a frame comprising a plurality of channel forming parts extending around the frame, at least three rolling friction reducing units mounted on the frame and arranged for simultaneous engagement with a surface, all the friction reducing units being pivotally mounted upon the frame about parallel axes, each such unit being movable about its axis between a first position and a second position spaced at right angles from said first position, a plurality of operating bars which are connected to one another around the frame and are disposed within the respective channel forming parts of the frame, means interconnecting adjacent ends of adjacent operating bars, said means being connected to the rolling friction reducing units respectively, a plurality of actuating means on the frame connected to the operating bars and controlling all operating bars to move all the rolling friction reducing units between their respective first and second positions.

2. A load carrying pallet having a frame, at least three rolling friction reducing units mounted on the frame and arranged for simultaneous engagement with a surface, all the friction reducing units being pivotally mounted upon the frame about parallel axes, each such unit being movable about its axis between a first position and a second position spaced at right angles from said first position, a plurality of operating bars connected to one another around the frame, means interconnecting adjacent ends of adjacent operating bars, said means being connected to the rolling friction reducing units respectively, a plurality of actuating means on the frame connected to the operating bars and controlling all operating bars to move all the rolling friction reducing units between their respective first and second positions, the actuating means being adapted for connection to an actuating means of an adjacent pallet for simultaneous operation thereof.

References Cited

UNITED STATES PATENTS

| | | | |
|---|---|---|---|
| 490,485 | 1/1893 | Mackaye | 280—47.11 |
| 601,231 | 3/1898 | Blackburn | 280—47.11 |
| 1,402,257 | 1/1922 | Shea. | |
| 1,538,054 | 5/1925 | Ohnstrand | 280—47.11 |
| 1,745,258 | 1/1930 | Hallowell | 280—79.1 |
| 2,582,000 | 1/1952 | Bloomstran | 280—47.11 |
| 2,800,336 | 7/1957 | Major et al. | 280—47.11 |

KENNETH H. BETTS, *Primary Examiner.*

U.S. Cl. X.R.

280—103